(12) United States Patent
Drake et al.

(10) Patent No.: US 8,417,393 B2
(45) Date of Patent: Apr. 9, 2013

(54) DEMAND RESPONSE APPLIANCE MODULE

(75) Inventors: Jeff Donald Drake, Louisville, KY (US); Timothy Dale Worthington, Louisville, KY (US); Michael F. Finch, Louisville, KY (US); John K. Besore, Louisville, KY (US)

(73) Assignee: General Electric Company, Schenectady, NY (US)

( * ) Notice: Subject to any disclaimer, the term of this patent is extended or adjusted under 35 U.S.C. 154(b) by 298 days.

(21) Appl. No.: 12/644,509

(22) Filed: Dec. 22, 2009

(65) Prior Publication Data

US 2011/0153109 A1    Jun. 23, 2011

(51) Int. Cl.
*G05D 3/12* (2006.01)
(52) U.S. Cl.
USPC .......................................... 700/296; 700/295
(58) Field of Classification Search .................. 700/296
See application file for complete search history.

(56) References Cited

U.S. PATENT DOCUMENTS

| 4,847,781 | A  | * | 7/1989  | Brown et al. .................. 700/296 |
| 7,010,363 | B2 |   | 3/2006  | Donnelly et al. |
| 7,079,967 | B2 |   | 7/2006  | Rossi et al. |
| 8,073,573 | B2 | * | 12/2011 | Chassin et al. ................ 700/286 |
| 2003/0233201 | A1 | * | 12/2003 | Horst et al. ...................... 702/62 |
| 2004/0224630 | A1 | * | 11/2004 | MacFarland .................. 455/11.1 |
| 2006/0036350 | A1 | * | 2/2006 | Bohrer et al. ................. 700/276 |
| 2007/0021874 | A1 | * | 1/2007 | Rognli et al. ................. 700/295 |
| 2008/0315000 | A1 |   | 12/2008 | Gorthala et al. |

* cited by examiner

*Primary Examiner* — Mohammad Ali
*Assistant Examiner* — Sivalingam Sivanesan
(74) *Attorney, Agent, or Firm* — Global Patent Operation

(57) ABSTRACT

The present disclosure provides a method of controlling an appliance comprising: profiling at least one appliance including one or more power consuming functions connected with a home energy management system (HEM); defining an energy event corresponding to each of the one or more power consuming functions; developing a home energy profile in the HEM of all the energy events including a calendar of energy events; manipulating the home energy profile by a user wherein the user cancels, delays, reschedules, or enables processing of the calendar of energy events; and, communicating through a translator board wireless communication between the HEM and the at least one appliance.

7 Claims, 3 Drawing Sheets

DEMAND RESPONSE APPLIANCE MODULE

BACKGROUND

This disclosure relates to energy management, and more particularly to electrical device control methods and electrical energy consumption systems. The disclosure finds particular application to energy management of home appliances, for example, dishwashers, clothes washers, dryers, HVAC systems, etc.

Many utilities are currently experiencing a shortage of electric generating capacity due to increasing consumer demand for electricity. Currently utilities generally charge a flat rate, but with increasing cost of fuel prices and high energy usage at certain parts of the day, utilities have to buy more energy to supply customers during peak demand. Consequently, utilities are charging higher rates during peak demand. If peak demand can be lowered, then a potential huge cost savings can be achieved and the peak load that the utility has to accommodate is lessened. In order to reduce high peak power demand, many utilities have instituted time of use metering and rates which include higher rates for energy usage during on-peak times and lower rates for energy usage during off-peak times. As a result, consumers are provided with an incentive to use electricity at off-peak times rather than on-peak times.

Presently, to take advantage of the lower cost of electricity during off-peak times, a user must manually operate power consuming devices during the off-peak times. This is undesirable because a consumer may not always be present in the home to operate the devices during off-peak hours. This is also undesirable because the consumer is required to manually track the current time to determine what hours are off-peak and on-peak.

One proposed third party solution is to provide a system where a controller "switches" the actual energy supply to the power consuming device on and off. However, there is no active control beyond the mere on/off switching. There are also currently different methods used to determine when variable electricity-pricing schemes go into effect. There are phone lines, schedules, and wireless signals sent by the electrical utility company. One difficulty is that different electrical companies use different methods of communicating periods of high electrical demand to their consumers. Other electrical utility companies simply have rate schedules for different times of day.

Therefore, there is a need to provide a system that can automatically operate power consuming devices during off-peak hours in order to reduce consumer's electric bills and also to reduce the load on generating plants during on-peak hours.

BRIEF DESCRIPTION

The present disclosure reduces power consumption by reducing the energy demand on the power generation facility, and also enabling the user/consumer to pay less to operate appliances on an annual basis.

One advantage of this approach is that customers have complete control of their power. There have been proposals by utilities to shut off customers if they exceed demand limits or increase the number of rolling brownouts. The proposed method also gives a customer finer granulity in their home in terms of control. A customer does not have to load shed a room, or load shed completely an appliance, in order to manage energy savings of a single device.

This disclosure also advantageously provides modes of load shedding in appliances, lighting, or HVAC other than "on/off" to make the situation more acceptable from the perspective of the customer.

In one aspect of the disclosure, a home energy management system (HEM) is provided comprising at least one appliance including one or more power consuming functions connected with the HEM including an associated utility derived energy signal. The HEM includes all the energy events wherein each energy event includes at least a duration of event. An energy profile is controlled by a user through the HEM wherein the energy profile includes a calendar of energy events.

In another aspect of the disclosure, a method of managing energy is provided comprising: profiling at least one appliance including one or more power consuming functions connected with a home energy management system (HEM); defining an energy event corresponding to each of the one or more power consuming functions; developing a home energy profile in the HEM of all the energy events including a calendar of energy events; and, manipulating the home energy profile by a user.

In still a further aspect of the disclosure, a method of controlling an appliance is provided comprising: profiling at least one appliance including one or more power consuming functions connected with a home energy management system (HEM); defining an energy event corresponding to each of the one or more power consuming functions; developing a home energy profile in the HEM of all the energy events including a calendar of energy events; manipulating the home energy profile by a user wherein the user cancels, delays, reschedules, or enables processing of the calendar of energy events; and, communicating through a translator board wireless communication between the HEM and the at least one appliance.

An advantage is the ability to control functions and features within the appliance and/or unit at various energy levels, without burdening the microprocessor memory usage on each appliance.

Another benefit is the increased flexibility with an associated electrical service provider, and the provision of several modes of operation (not simply an on/off mode).

Still other benefits relate to modularity, the ability to handle multiple communication methods and protocols without adversely impacting the cost of the appliance, opening up appliances to a variety of protocols, enabling demand side management or energy management, and/or providing for a standard interface to the appliance (for example, offering prechill and/or temperature set change during on-peak hours).

Still other features and benefits of the present disclosure will become apparent from reading and understanding the following detailed description.

DETAILED DESCRIPTION

Figure 1:
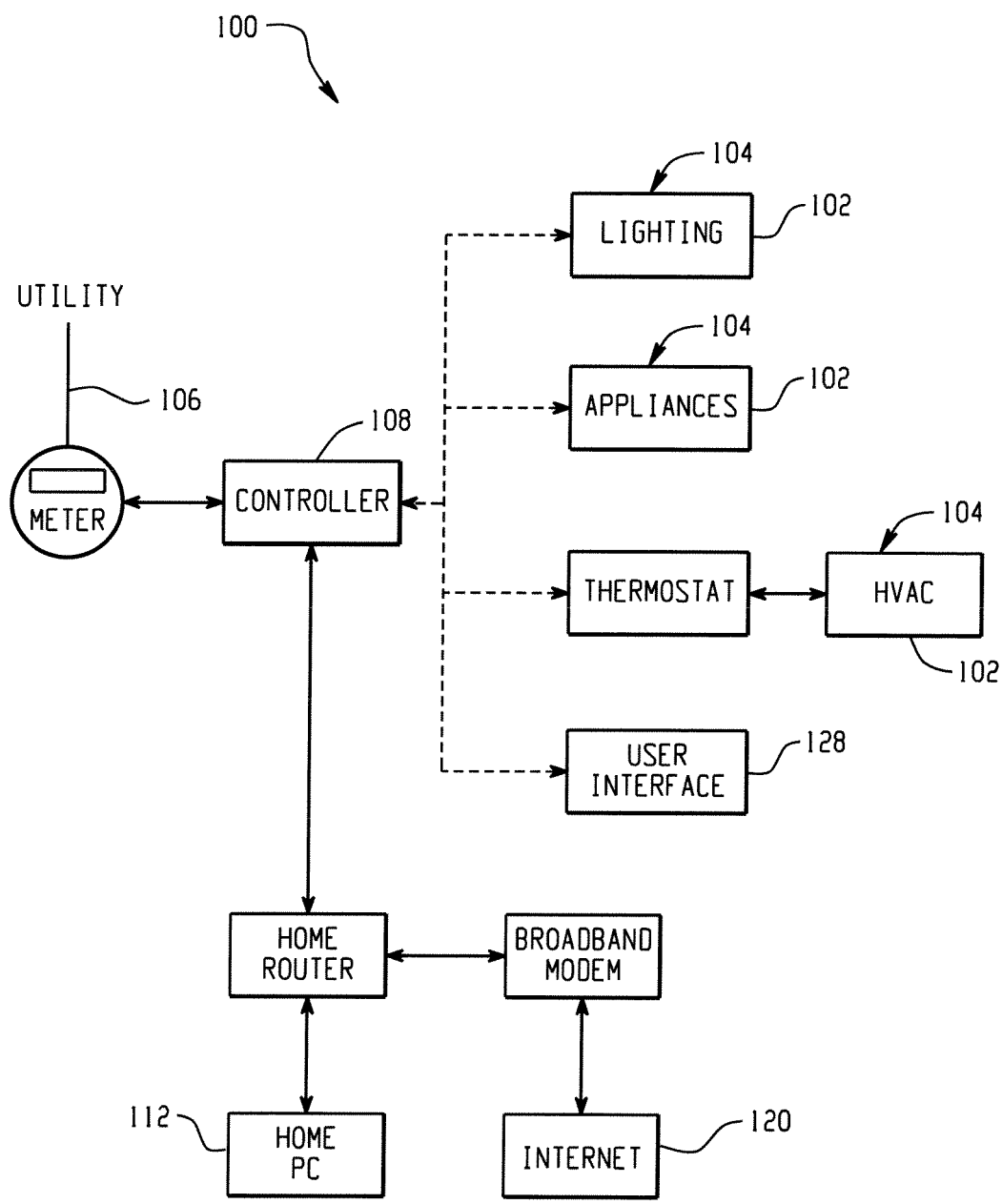
FIG. 1 illustrates an exemplary embodiment of an energy management system for household appliances.

In one embodiment, a system is provided to handle energy management between the utility and the homeowner's appliances. The system can include one or more of the following: a controller, utility meter, communication network, a module translator board, intelligent appliances, local storage, local generator and/or demand server. The demand server is a computer system that notifies the controller when the utility is in peak demand and what is the utility's current demand limit. A utility meter can also provide the controller the occurrence of peak demand and demand limit. The demand limit can also be set by the home owner. Additionally, the homeowner can choose to force various modes in the appliance control based on the rate the utility is charging at different times of the day.

Each intelligent appliance has a communication interface that links itself to the translator board. This interface can be wireless, and/or wired. The translator board will interact with the appliance and lighting controls as well as thermostat (for HVAC) to execute the users preferences/settings.

Enabled appliances receive signals from the utility meter and help lower the peak load on the utility and lower the amount of energy that the consumer uses during high energy cost periods of the day. There are several ways to accomplish this, through wireless communication (ZigBee, proprietary 802.15.4, FM radio, WiFi, etc) or through wired communication. Alternatively, using passive RFID tags that resonate at different frequencies resonated by the master, or one or more active RFID tags that can store data that can be manipulated by the master device and read by the slave devices(s) is an effective and potentially lower cost communication solution since there is no protocol. Rather, a pulse of energy at a particular frequency will allow a low cost method with an open protocol for transmitting/communicating between a master device and one or more slave devices, and appropriate functions/actions can be taken based upon these signals.

The central controller can handle energy management between the utility and the translator board. The controller can include notification of an energy saving mode based on demand limit read from one or more of a utility meter, utility, demand server or user. An energy savings mode of an appliance can thereby be controlled or regulated based on priority and energy need level sent from the controller and/or the customer (FIG. 6). Likewise, consideration to use of local energy storage and use of a local generator to offset peak demand limit can be incorporated into the energy management considerations, or provide the ability to override mode of energy savings through the controller or at the translator board.

How much energy the appliance consumes in peak demand and/or in a demand response setting is based on priority of the device and the energy need level. If the appliance's priority is high, then the appliance will most likely not go into a saving mode. The energy need level is based on how little energy the appliance can consume during peak demand and still provide the function setting it is in (i.e. in a refrigerator, ensuring that the temperature is cool enough to prevent spoiling). It will also be appreciated that an appliance may have multiple energy need levels.

A method of communicating data between a master device, i.e. translator board, and one or more slave devices, i.e. appliances, may advantageously use continuous tone-coded transmission system. This can be a number of states or signals, either using one or more continuous tones that signify different rate states coming from the home area network (from meter) or the utility. Additionally, one could send a combination of tones to transmit binary messages using a few tones. The slave devices will incorporate a receiver that receives the carrier frequency and then decodes the continuous tone which corresponds to the particular state of the utility rate. Once the "receiver board" detects the tone, then the downstream circuitry will trigger the appropriate response in the appliance. The carrier frequency in this scheme can be numerous spectrums, one being the FM broadcast band or a specific FM band allocated by the FCC for low level power output. The advantage of broadcast band FM is the low cost of such devices and the potential to penetrate walls, etc. within a home with very low levels of power due to the long wavelength of the 89-106 MHz carrier. This process is used today in 2-way radio communications to reduce the annoyance of listening to multiple users on shared 2-way radio frequencies. The process in these radios is referred to as CTCSS (continuous tone-coded squelch system) and would find application in this end use.

Generally, it is not known to have modular interfaces that can receive signals from a control source. Also, no prior arrangements have functioned by addressing the control board of the appliance with a signal that directs the appliance to respond.

Figure 2:
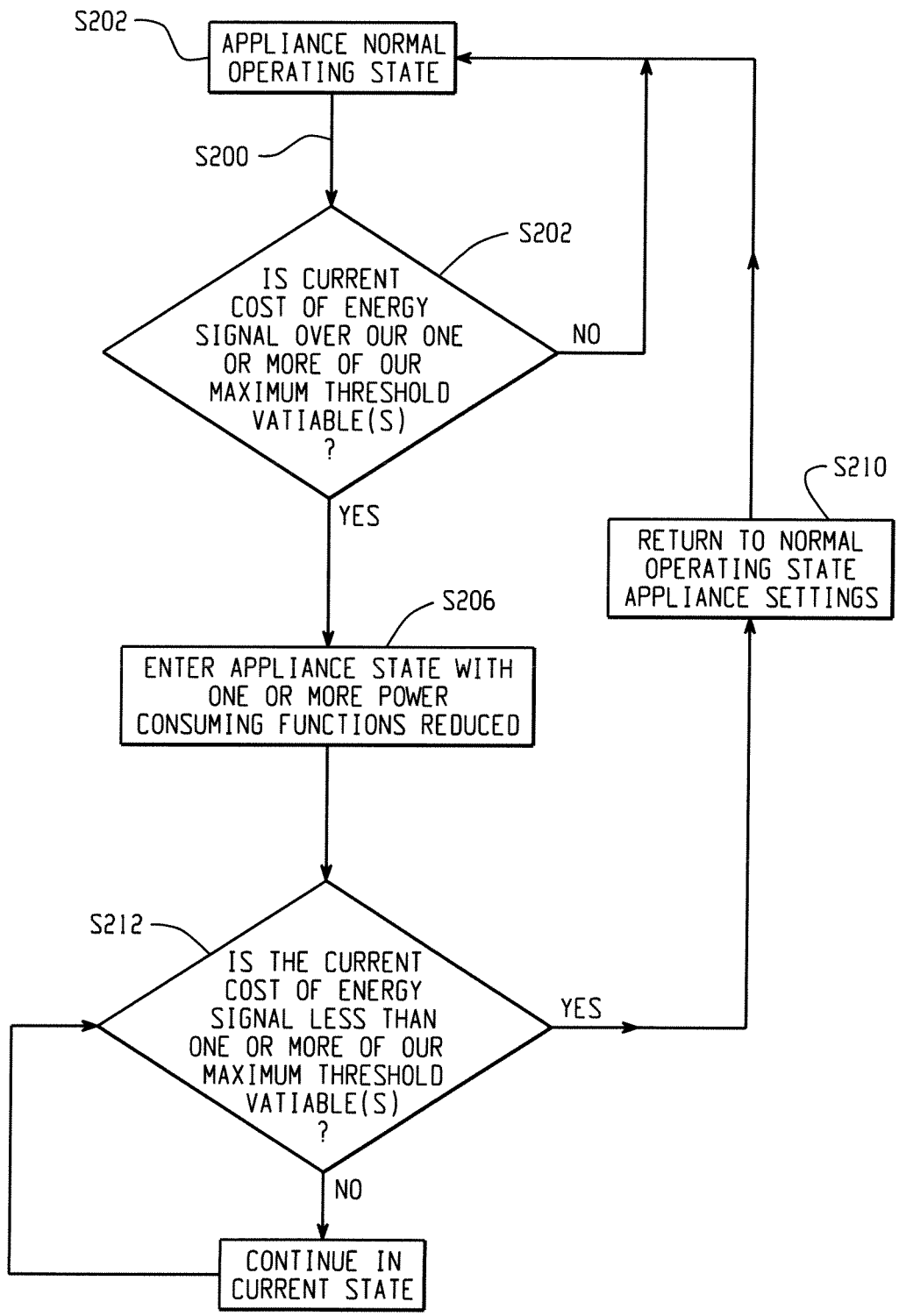
FIG. 2 illustrates an exemplary operational flow chart of managing an appliance based on one exemplary threshold variable.
Figure 3:
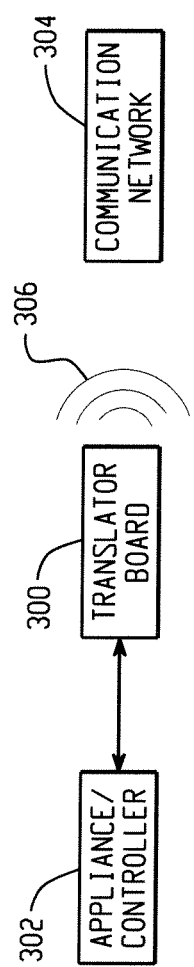
FIG. 3 illustrates an exemplary embodiment of a communication network between appliances and the translator board.

An exemplary embodiment of a managed appliance system 100 is schematically illustrated in FIGS. 1-3. An exemplary embodiment of a home energy management system 100 having one or managed appliances 102 is schematically illustrated in FIG. 1. The appliances 102 each comprise at least one power consuming feature/function 104. The home energy management system (HEM) 100 is operatively associated with the power consuming features/functions 104. The HEM 100 can include a controller or micro computer 108 which is programmed to selectively control the energization of the power consuming features/functions 104. The HEM 100 is configured to receive and process a signal 106 from an associated utility, whereby the HEM 100, through the controller 108, is in signal communication with the associated utility. The controller 108 is configured to receive and process the signal 106 from the associated utility. The HEM can convert the signal 106 through a series of variables and compare to a series of demand response (DR) threshold variables. The appliance can be operated including the one or more power consuming functions based on the comparison of the converted signal to the demand response threshold variables (FIG. 2).

The HEM 100 can operate one or more associated appliances 102 along with respective one or more power consuming functions 104, selectively when the comparison of the converted signals are within the DR threshold variable parameters. The DR threshold variables or parameters can be established by a user interface 128 and/or though a computer 112. The threshold variables can comprise the group of variables including dollars per kilowatt hour, carbon usage, maximum criticality level of demand, minimum criticality level of demand, price tiers, et al.

With reference to FIG. 2, a control method in accordance with the present disclosure comprises communicating with an associated utility and receiving and processing the signal indicative of at least one threshold variable (S200), determining a current value in relation to the one threshold variable (S202), operating the appliance in a first operating mode during one period relative to a first comparison between the current value and the threshold variable (S204), operating the appliance in a second operating mode during another period relative to a second comparison between the current value and the threshold variable (S206), selectively adjusting any number of one or more power consuming features/functions of the appliance to adjust power consumption of the appliance in the second operating mode (S206), and returning to the first operating mode (S210) after the threshold variable is over (S212). The selective adjustment can include adjusting power in the second operating mode, for example, selecting one or more of the operational adjustments described above.

It is to be appreciated that appliances can be delayed in their operation, rescheduled for a later start time, and/or altered in their functioning/features in order to reduce energy demands. Some appliances lend themselves to an altered operation due to their functionality. For example, dishwashers, clothes washers, and clothes dryers all have the capacity to run as needed because demand on these appliances is either not constant and/or the functions of these appliances are such that immediate response is not necessary. As one illustrative example, a dishwasher that has been loaded during the daytime, i.e., on-peak demand period hours, can be programmed to start its operations for a later, albeit off-peak demand hours. It is to be appreciated that on-peak and off-peak demand hours can correspond to high utility costs and relatively low utility costs ($/kilowatt), respectively.

The operation of the appliance may vary as a function of a characteristic of the supplied energy, e.g., availability and/or price. Because some energy suppliers offer what is known as time-of-use pricing in their tariffs, price points could be tied directly to the tariff structure for the energy supplier. If real time pricing is offered by the energy supplier serving the site, this variance could be utilized to generate savings and reduce chain demand. Another load management program offered by energy supplier utilizes price tiers which the utility manages dynamically to reflect the total cost of energy delivery to its customers. These tiers provide the customer a relative indicator of the price of energy and are usually defined as being LOW (level 1), MEDIUM (level 2), HIGH (level 3), and CRITICAL (level 4). The operational and functional adjustments described above, and others, can be initiated and/or dependent upon the tiers, i.e. threshold variables. For example, a dishwasher sanitize cycle, and/or other functions, can be prevented or 'blocked' from activating if the pricing tier is at level 3 or 4

The use of the module translator board (FIG. 3) 300 in between the appliance and a utility, wireless energy device, communication network 304, HEM 100, etc. to handle all wireless protocol information (including proprietary wireless on 802.15.4, Zigbee, and Smart Energy Profile information) reduces the demand on microprocessor/microcontroller memory usage on the appliances 302 (including dishwashers, refrigerators, oven ranges, clothes washing machines, clothes dryers, microwave ovens, water heaters, and room air conditioners). The translator board 300 can provide the ability (via card slot, connector connection, etc.) to interact with a variety of different radio or wireless cards including: Zigbee, Proprietary 802.15.4, FM radio, and WiFi. The translator board 300 can also act as a translator for protocol profiles e.g. Smart Energy Profile or any Home Automation profile. These profiles require a lot of software overhead so the translator board 300 will translate these profiles into a simple current energy level to each appliance.

Zigbee Smart Energy Profile data events can be given a time an event starts and a time an event ends. The translator board 300 can create a calendar of events with each of these Smart Energy Profile messages. For example, a Smart Energy Profile event with a start time and an end time will be converted to a calendar event and at the time the event is supposed to begin the calendar will send the appropriate event with all of the appropriate data included in this event. The calendar can store many events and one important feature if you use an event calendar technique is that you can remove any event at any time with an appropriate event ID. Smart Energy profile commands contain "Cancel Event" messages if an event that was previously sent out needs to be canceled. Event calendars do not hold events in any order so any events can be removed from the calendar at any time.

The translator board 300 can use MOBDUS or MODBUS ASCII to communicate to appropriate radios or wireless modules 306. The translator board 300 will also have the capability to communicate via Spi, I2C, RS232 Uart, or LVTTL (or TTL) full duplex serial to any radio or wireless module that will be connected to it. If the translator board 300 loses connectivity to the wireless host or server for a designated amount of time, then the translator can communicate the lowest energy level, or other pre-selected energy level, to all appliances in order for the appliances to function in full operation without needing to remove the translator board. There can be a "test" mode on the translator board that can be entered via button press, user interface sequence, or any kind of serial or wireless communication that will allow the module to scroll through each energy level rate and observe the reaction or response on the appliance. The idea of this mode is to enable an easy means of testing appliance response without needing to wait for utility or energy manager server energy level updates.

The use of the translator board 300 reduces the problem of increasing microcontroller ROM/RAM/EEPROM size by the incorporation of wireless/energy management technologies onto each appliance control 302. The smart energy profile data can be sent as event start and stop time commands. All of these commands can be accumulated into a calendar of events wherein the events are in no particular order but can contain their event ID, the time/date the event needs to occur, data in the event, and an event name. With this calendar method, many events can be stored. Since the events are stored in memory in no particular order, any event can be removed at any time. Once an event occurs it is automatically removed from the calendar.

The translator board can contain a "card" connection or "circuit board" connection via a board to board connection interface for all radio or wireless technologies. This provides for a way to accommodate many radio or wireless technologies with the same translator board. When the "card" or "circuit board" is connected the translator board can detect what interface/protocol the card is using and map the internal software accordingly. There can be one common connection from the translator board to all of the respective appliances in order to enable a single translator board to function with all of the appliances.

The disclosure has been described with reference to the preferred embodiments. Obviously, modifications and alterations will occur to others upon reading and understanding the preceding detailed description. It is intended that the disclosure be construed as including all such modifications and alterations.

What is claimed is:

1. A home energy management system comprising:
 at least one appliance including one or more power consuming functions connected with the home energy management system (HEM);
 an energy profile comprising at least one calendared energy event;
 a controller configured to receive and process a demand response signal from an associated utility, the demand response signal indicative of a current energy cost level associated with a current energy cost data supplied by the associated utility;
 a translator board for wireless communication of the current energy cost level and/or a calendared energy event of the at least one calendared energy event from the HEM to the at least one appliance;

wherein (i) the controller effects a load controlling scheme of at least one of the at least one appliance, wherein the at least one of the at least one appliance operates in a full operating mode when the current energy cost level is at or below a predetermined threshold level and/or before or after the calendared energy event, and in a second operating mode when the energy cost level is above the threshold value and/or during the calendared energy event, (ii) in the second operating mode, the at least one of the at least one appliance skips at least one of the power consuming functions from a cycle of functions to shed a load, and (iii) in an event the translator board loses connectivity with an associated wireless host or server, the translator board is configured to automatically communicate a signal to enable the at least one of the at least one appliance to function in the full operating mode without requiring a removal of the translator board.

2. The home energy management system according to claim 1, wherein the translator board includes duplex serial capability.

3. The home energy management system according to claim 1, wherein the at least one appliance includes a default control which enables functions in the full operating mode in an event any communication between the HEM and the at least one appliance is compromised.

4. A method of managing energy comprising:
profiling at least one appliance including one or more power consuming functions connected with a home energy management system (HEM);
defining an energy event corresponding to each of the one or more power consuming functions;
developing a home energy profile in the HEM of all the energy events including a calendar of energy events;
receiving and processing via a controller a demand response signal indicative of at least one of the calendared energy events; and
wirelessly communicating the at least one calendared energy event via a translator board from the HEM to at least one of the at least one appliance;

wherein (i) effecting, via the controller, a load controlling scheme of the at least one of the at least one appliance, wherein the at least one of the at least one appliance operates in a full operating mode before and after the at least one calendared energy event and in a second operating mode during the at least one calendared energy event, (ii) in the second operating mode, skipping at least one of the power consuming functions from a cycle of functions of the at least one of the at least one appliance and shedding a load, and (iii) in an event the translator board loses connectivity with an associated wireless host or server, automatically communicating a signal via the translator board to the at least one of the at least one appliance so that the at least one of the at least one appliance is able to function in the full operating mode without requiring a removal of the translator board.

5. The method of managing energy according to claim 4, wherein the translator board includes duplex serial capability.

6. The method of managing energy according to claim 4, wherein each energy event includes information selected from the group consisting of event ID, date of event, time of event, duration of event, functional data of event, energy consumption of event, and event name.

7. The method of managing energy according to claim 4, wherein the at least one appliance includes a default control which functions in the full operating mode in an event any communication between the HEM and the at least one appliance is compromised.

* * * * *